United States Patent [19]

Lewis

[11] 3,963,882
[45] June 15, 1976

[54] BORON OR GRAPHITE REINFORCED VOICE COIL AND MANUFACTURING PROCESS

[75] Inventor: Raymond M. Lewis, Burnsville, Minn.

[73] Assignee: Control Data Corporation, Minneapolis, Minn.

[22] Filed: Mar. 14, 1975

[21] Appl. No.: 558,615

[52] U.S. Cl. .................. 179/115.5 VC; 29/594; 29/605; 335/250
[51] Int. Cl.² .................. H01F 5/02; H01F 41/06; H04R 1/00
[58] Field of Search ........... 179/115.5 VC; 335/299, 335/250, 282; 29/594, 595, 606, 605

[56] References Cited
UNITED STATES PATENTS

| 2,207,240 | 7/1940 | Cornwell.................. 179/115.5 VC |
| 2,713,715 | 7/1955 | Jenner et al. .................. 29/606 |
| 3,160,840 | 12/1964 | Liberman.................. 29/606 |
| 3,267,968 | 8/1966 | Foll et al.................. 29/594 |
| 3,792,394 | 2/1974 | Bertagni.................. 179/115.5 VC |

FOREIGN PATENTS OR APPLICATIONS

| 1,205,610 | 9/1970 | United Kingdom ....... 179/115.5 VC |
| 381,803 | 10/1932 | United Kingdom ....... 179/115.5 VC |
| 333,280 | 8/1930 | United Kingdom ....... 179/115.5 VC |

*Primary Examiner*—George G. Stellar
*Attorney, Agent, or Firm*—Edward L. Schwarz

[57] ABSTRACT

An armature adapted for use in a voice coil or linear motor and having a conductor winding and at least one stiffening layer coaxial and coextensive with, either inside or outside, the conductor winding. The stiffening layer is formed of a multiplicity of turns of a high elastic modulus, non-magnetic fiber such as graphite. The fiber and conductor turns are all firmly bonded into a rigid, composite unitary cylinder by a substance such as epoxy impregnating the entire composite cylinder. In a preferred embodiment, the conductor turns are located between interior and exterior layers. In a preferred method for manufacturing such an armature, the composite cylinder is formed layer by layer on a rotating mandrel, impregnating each layer with epoxy resin premixed for self-hardening.

18 Claims, 2 Drawing Figures

BORON OR GRAPHITE REINFORCED VOICE COIL AND MANUFACTURING PROCESS

BACKGROUND OF THE INVENTION

1. Field of the Invention

In the so called voice coils or linear motors employed for a variety of positioning and actuating tasks, and in particular for positioning the head-carrying arms adjacent the individual tracks on the discs of a disc memory, it is desirable that the armature acceleration be as great as possible. In the typical voice coil, the armature is approximately cylindrical, shifting back and forth through an annular flux gap. For a description of such a voice coil, see U.S. Pat. No. 3,810,776 (Chari), which has a common assignee with this application.

In the embodiment of interest here, a closed loop servo system is employed to position the armature at each specified set point. The individual armature positions thus form a set of set points in a disc memory. When attempting to maintain the armature at a set point a sensor moving with and usually mounted on the load provides data specifying load position to the servo system. Thus, in disc memory drives frequently one head and its associated recording surface are dedicated to providing armature position data by the head's reading of servo tracks permanently recorded in the recording surface. To maintain the desired position the servo system must frequently adjust the load position with appropriate drive pulses to the armature in response to the armature position signals. In the disc memories in use today head position must be controlled to within a few 1/100,000ths of an inch. To maintain this highly accurate positioning, the servo system must have relatively high gain, with a high frequency of drive pulses to the armature. It is well known that a high gain servo system containing elements having relatively undamped resonances within certain frequency bands can cause instability in servo loop performance. (The spectral position of these bands depends on a variety of factors such load mass, motor force, transducer sensitivity, time lags, servo gain, etc.) It is therefore essential to either dampen the vibrations of each such element or shift the resonant frequencies out of these bands.

2. Description of the Prior Art

It is known that the armature used in such voice coils is a major source of the resonance causing instability and inaccuracy. It is also known that increasing radial stiffness, i.e. resistance to radially directed forces, of the armature will increase the frequency of its axial vibratory displacements which interfere with servo performance. In such voice coil applications as in disc memories, increasing radial armature stiffness will frequently remove a system resonance from the servo loop critical frequency bands and permit servo loop gain of a level not otherwise available, resulting in increased stability and accuracy.

The simplest armature having appreciable radial stiffness comprises a helically wound coil with adjacent turns along a radius bonded to each other by some appropriate agent. In this design, the wall stiffness of the armature is that of the combined copper and bonding agent structure. Another design employs a nonmagnetic relatively stiff bobbin upon which the armature wire is wound. In such a design the bobbin and the wire function together to increase stiffness of the cylinder. An improvement on this design employs a winding having two layers of turns, the layers being separated by a spacer and thereby achieving additional stiffness by the thickening of the cylinder wall. The resonant frequency of these designs for a certain set of dimensions range from around 500 to 700 Hz. This relatively low frequency has a significant effect on the accuracy of the armature position.

SUMMARY OF THE INVENTION

The article of the invention is an armature having at least one high elastic modulus, non-magnetic layer coextensive and coaxial with the layer formed by the conductive winding and rigidly attached thereto, to increase radial stiffness of the assembly. The stiffening layer is formed of a multiplicity of turns of a suitable fiber having the requisite high elastic modulus and non-magnetic characteristics and is snugly fitted to the winding itself. The stiffening fiber and conductor turns are all firmly bonded together into a rigid cylinder by a matrix formed of a high strength agent such as epoxy glue. The term "matrix" is here used to mean the material within which the various fiber and conductor turns are located. The stiffening fiber preferably comprises graphite, although cost permitting, boron or other high modulus materials can also be used. Although stiffness of the armature is significantly improved by employing a single layer formed of the fiber and located either internal or external to the conductor cylinder, it is preferable to place the fiber windings both inside and outside the conductor cylinder. This embodiment employs the conductor as the spacer and locates the high modulus fibers at the outside edges of the armature wall cross section, the area contributing the maximum moment of inertia to the cross section segment, and hence increases its radial stiffness the maximum possible for the amount of high modulus fibers involved. Both stiffening layers have their individual turns firmly embedded in the previously-mentioned matrix, which then bonds the entire assembly into a cylinder having extraordinary radial stiffness. The resonant frequency of such a structure exceeds 900 Hz. for the above-mentioned set of dimensions.

The preferred method of manufacturing this article is by coating a mandrel mounted for rotation with liquid which self-hardens into the desired matrix, and winding on the fiber and conductor layers by spinning the mandrel. A fresh coat of the chosen self-hardening liquid is applied to the exterior of each completed layer, and the next layer wound on it.

Accordingly, one purpose of this invention is to produce an electro-magnetic coil having improved radial stiffness with little or no increase in weight.

A second purpose to increase the natural resonant frequency of such coils.

A third purpose is to increase the speed and decrease cost of manufacturing such a coil.

Still another purpose is to permit use of the coil with high frequency band width control loops.

DESCRIPTION OF THE PREFERRED EMBODIMENTS

Figure 1:
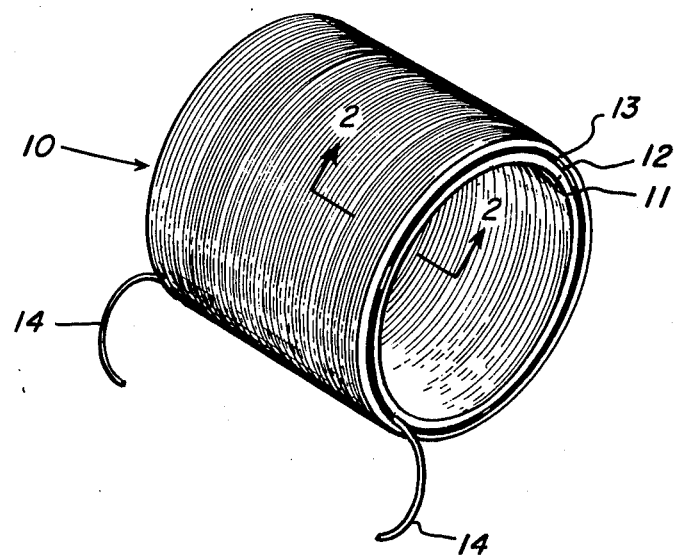
FIG. 1 is a perspective view of the armature.
Figure 2:
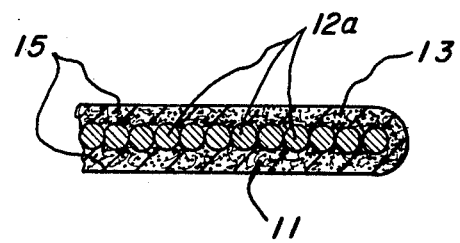
FIG. 2 is a cross sectional view taken of the wall of the armature in a plane parallel to the armature axis.

Referring first to FIG. 1, armature 10 has the shape of a hollow cylinder having preselected inside and outside diameters chosen to properly slide in the flux gap of a particular voice coil. Armature 10 comprises three distinct and individual layers, each coextensive and coaxial with each other for at least a portion of the axial length. Inner layer 11 and outer layer 13 are both formed of a multiplicity of turns of a high elastic modulus fiber embedded in and firmly adherent to a rigid matrix shown generally by reference numeral 15 in FIG. 2. Referring to FIG. 2, the cross sections of layers 11 and 13 show the cut ends of these fibers. Each individual fiber turn may comprise a closed loop or ring, or as is preferred, the high modulus fiber may be wound as is thread on a spool, to form the required turns. The layer formed by winding 12 comprises the actual electromagnetic coil and comprises one or more layers of spirally wound conductor with any desired inter-turn spacing. Individual conductor turns 12a are bonded to individual adjacent turns of the high modulus fiber by portions of rigid matrix 15 adhering to both conductor turns 12a and the high modulous fibers. Leads 14 conduct drive current to winding 12.

The construction of outer layer 13 is identical to that of inner layer 11, and is mechanically bonded to the exterior surfaces of winding 12. Both outer layer 13 and inner layer 11 are snugly fitted to winding 12.

Because of the previously mentioned mode of distortion induced in the coil, the important factor is that the armature 10 have its greatest rigidity with respect to radial forces occuring about the armature as a result of the vibration of the armature. Rigidity as far as axial loads are concerned is not nearly as important. The fiber from which layers 11 and 13 are formed can be of any of the high elastic modulus, non-magnetic, and highly electrically resistive fibers now widely available. At the present time, graphite fiber is preferred because of its relatively low cost. However, with decrease in the costs of boron and other exotic fibers, these will likely become increasingly competitive with graphite over the years. The matrix in which the fiber and conductor turns are all embedded should be a relatively high strength material which is easily worked with and forms a strong mechanical bond with both the fiber employed and the conductor. Two-part epoxy glue which hardens naturally after mixing is an ideal substance for this purpose.

To achieve maximum rigidity, the high elastic modulus fiber must be as near the inner and outer surfaces of armature 10 as possible at the location where the elemental areas of the cross section contribute the maximum to the moment of inertia of the cross section about an axis passing through the center of the individual conductor turns 12a. Matrix 15 is merely to fix the position of individual fibers in armature 10 so that radial forces thereon are resisted by elongation and compression of the fibers.

The stiffening fibers are preferably of relatively high electrical resistance, so that, if adjacent turns are in electrical contact with each other, eddy currents will not flow which will decrease power and efficiency of the armature. If the stiffening fiber is highly conductive, then it is necessary to insulate the turns from each other so as to prevent the creation of these undesirable currents. Experience has shown that the preferred graphite fiber is highly resistive and when embedded in a preferred epoxy glue matrix apparently has few shorted turns and negligible creation of eddy currents.

While the previously described article results in maximum stiffness, variations on its construction may be suitable in certain circumstances. As is well known, maximum stiffness results when the total number of the stiffening fiber turns is divided equally between the inner and outer layer 11 and 13. However, an alternative design would be to place all the stiffening turns of fiber on either the inside or the outside of the armature, which will result in less radial stiffness for the total number of turns involved. In this design, the conductor itself must contribute a greater amount of the total stiffness to the article and the lower modulus of the copper (or aluminum) forming coil 12 results in reduced total stiffness.

The preferred method for manufacturing this armature involves forming the three layers by winding the fiber and conductor turns required on a rotating mandrel in the proper order, impregnating the turns layer by layer with suitable epoxy resin which has been premixed to self-harden into the desired matrix. Such a mandrel should have an outer cylindrical shape corresponding to the desired inner shape and dimensions of armature 10. It can be mounted in a drill press or lathe and rotated thereby. The mandrel should be coated with mold wax, which prevents the epoxy glue from adhering to the mandrel. The mandrel is then coated with a thick layer of epoxy resin glue pre-mixed to self-harden and inner layer 11 is formed by loosely and evenly winding one or more layers of the stiffening fibers on the mandrel. Such fibers are commonly available in very long loose bundles comprising many thousands of individual fine fibers which make it a simple task to form the tens of thousands of turns of fine stiffening fiber required. If many layers of stiffening fiber are required, it may be necessary to recoat the fibers forming the partially complete inner layer, with liquid resin to ensure that all of the turns are impregnated with the resin. After inner layer 11 is complete its outer surface is coated with the resin and the conductor winding is placed directly on inner layer 11. Again, each layer of winding 12 should be coated with resin so as to bond the conductor turns firmly to their neighbors. It is preferable to wind winding 12 with "handedness" opposite that of layer 11, so as to cause individual conductor turns 12a to cross the turns of layer 11. By opposite "handedness" is meant that one winding advances as a right hand screw and the other advances as a left hand screw. This prevents turns 12a from sinking into and axially displacing turns forming layer 11, resulting in reduced radial stiffness of the finished product. The exterior surface of winding 12 is coated with epoxy and covered with more turns of the stiffening fiber, again taking the same precautions to ensure that all turns are firmly bonded to each other. A final coat of resin on the outside of outer layer 13 may be necessary to assure rigidity of the fibers comprising outer layer 13.

By extending inner and outer layers 11 and 13 past the end of winding 12, a space may be created between them in which a connecting bracket or cylinder may be located and bonded to armature 10 by the epoxy, to which the driven mechanism may be attached. However, means by which armature force is supplied to the driven mechanism forms no part of this invention.

What is desired to be secured by letters patent is expressed in the following claims:

1. A cylindrically shaped voice coil armature having a conductor helically wound into a hollow, approximately cylindrical shape, a stiffening layer coextensive and coaxial with and snugly fitted to the conductor cylinder and formed of a multiplicity of turns of graphite fiber, and a matrix bonding each of the individual conductor and fiber turns all firmly to all other adjacent conductor and fiber turns.

2. The article of claim 1, wherein the fiber layer is outside the conductor cylinder.

3. The article of claim 1, wherein the fiber layer is inside the conductor cylinder.

4. The article of claim 3, wherein the coil comprises a second fiber layer of substantially the same composition and shape as the first, and coextensive and coaxial with, and snugly fitting outside the conductor cylinder, and the adherent matrix further bonds the individual turns of the second layer to all other adjacent fiber and conductor turns.

5. The article of claim 4, wherein the adherent matrix comprises hardened epoxy-type resin completely impregnating the fiber and conductor turns.

6. A method of manufacturing the article of claim 1, comprising the steps of
   a. wrapping the fiber around a cylindrical mandrel having an outside diameter equal to the desired inside diameter of the coil;
   b. wrapping an insulated conductor around the cylinder; and
   c. impregnating all the turns of both fiber and conductor with a liquid which hardens to form an adherent bond to both the conductor and the fiber.

7. The method of claim 6, wherein the wrapping steps further comprises using a mandrel to which liquid epoxy-type resin glue pre-mixed for self-hardening does not adhere, and the turn-impregnating step further comprises impregnating the turns with an epoxy-type resin glue pre-mixed for self-hardening.

8. The method of claim 7 further comprising the steps of:
   a. first coating the surface of the mandrel with the epoxy type glue; then
   b. wrapping a first layer of the graphite fiber on the epoxy-type glue coated mandrel; then
   c. coating the first graphite fiber layer with epoxy-type glue; then
   d. wrapping the conductor on the epoxy-coated first graphite fiber layer; then
   e. coating the conductor layer with epoxy-type glue; and finally
   f. wrapping a second layer of graphite fiber on the epoxy-coated conductor layer.

9. The method of claim 6, wherein the fiber layer is wound first on the mandrel, with a preselected "handedness," and the conductor winding is wound with the opposite "handedness."

10. A cylindrically shaped voice coil armature having a conductor helically wound into a hollow, approximately cylindrical shape, a stiffening layer coextensive and coaxial with and snugly fitted to the conductor cylinder and formed of a multiplicity of turns of boron fiber, and a matrix bonding each of the individual conductor and fiber turns all firmly to all other adjacent conductor and fiber turns.

11. The article of claim 10, wherein the fiber layer is outside the conductor cylinder.

12. The article of claim 10, wherein the fiber layer is inside the conductor cylinder.

13. The article of claim 12, wherein the coil comprises a second fiber layer of substantially the same composition and shape as the first, and coextensive and coaxial with, and snugly fitting outside the conductor cylinder, and the adherent matrix further bonds the individual turns of the second layer to all other adjacent fiber and conductor turns.

14. The article of claim 13, wherein the adherent matrix comprises hardened epoxy-type resin completely impregnating the fiber and conductor turns.

15. A method of manufacturing the article of claim 10, comprising the steps of
   a. wrapping the fiber around a cylindrical mandrel having an outside diameter equal to the desired inside diameter of the coil;
   b. wrapping an insulated conductor around the cylinder; and
   c. impregnating all the turns of both fiber and conductor with a liquid which hardens to form an adherent bond to both the conductor and the fiber.

16. The method of claim 15, wherein the wrapping steps further comprises using a mandrel to which liquid epoxy-type resin glue pre-mixed for self-hardening does not adhere, and the turn-impregnating step further comprises impregnating the turns with an epoxy-type resin glue pre-mixed for self-hardening.

17. The method of claim 16 further comprising the steps of:
   a. first coating the surface of the mandrel with the epoxy type glue; then
   b. wrapping a first layer of the boron fiber on the epoxy-type glue coated material; then
   c. coating the first boron fiber layer with epoxy-type glue; then
   d. wrapping the conductor on the epoxy-coated first boron fiber layer; then
   e. coating the conductor layer with epoxy-type glue; and finally
   f. wrapping a second layer of boron fiber on the epoxy-coated conductor layer.

18. The method of claim 15, wherein the fiber layer is wound first on the mandrel, with a preselected "handedness," and the conductor winding is wound with the opposite "handedness."

\* \* \* \* \*